United States Patent
Gudur et al.

(10) Patent No.: US 11,128,608 B2
(45) Date of Patent: Sep. 21, 2021

(54) RANDOMIZED TRAFFIC SELECTION FOR FLOW DECEPTION IN IPSEC AD-HOC AND CLOAKED NETWORKS

(71) Applicant: COLORTOKENS, INC., Santa Clara, CA (US)

(72) Inventors: Vinay Gudur, Bengaluru (IN); Abhisek Kumar Shaw, Bengaluru (IN); Mallesh Kanderayanahalli Marthandappa, Bengaluru (IN)

(73) Assignee: COLORTOKENS, INC., Santa Clara, CA (US)

( * ) Notice: Subject to any disclaimer, the term of this patent is extended or adjusted under 35 U.S.C. 154(b) by 298 days.

(21) Appl. No.: 16/140,671

(22) Filed: Sep. 25, 2018

(65) Prior Publication Data
US 2020/0099668 A1    Mar. 26, 2020

(51) Int. Cl.
*H04L 29/06* (2006.01)
*H04L 12/733* (2013.01)
*H04W 84/18* (2009.01)

(52) U.S. Cl.
CPC .......... *H04L 63/0485* (2013.01); *H04L 45/20* (2013.01); *H04L 63/1466* (2013.01); *H04L 63/164* (2013.01); *H04L 63/20* (2013.01); *H04W 84/18* (2013.01)

(58) Field of Classification Search
CPC ..... H04L 63/0485; H04L 63/20; H04L 45/20; H04L 63/1466; H04L 63/164; H04L 45/127; H04L 63/0272; H04W 84/18
See application file for complete search history.

(56) References Cited

U.S. PATENT DOCUMENTS

| | | | |
|---|---|---|---|
| 2003/0061495 A1* | 3/2003 | Minnick | H04L 63/0485 713/189 |
| 2011/0216656 A1* | 9/2011 | Pratt, Jr. | H04L 45/22 370/241 |
| 2015/0033010 A1* | 1/2015 | Fouladgar | H04W 40/02 713/153 |
| 2016/0099859 A1* | 4/2016 | Mohammadi | H04L 45/74 370/248 |
| 2018/0062992 A1* | 3/2018 | Cohn | H04L 45/586 |
| 2019/0215175 A1* | 7/2019 | Mathew | G06F 9/45558 |

* cited by examiner

*Primary Examiner* — Henry Tsang
(74) *Attorney, Agent, or Firm* — Barry Choobin; Patent 360LLC (57) ABSTRACT

In randomized traffic selection in a IPsec network, a source node sends a packet to a destination node. The packet is encapsulated with an application specific metadata header and the source node encapsulates the packet in a transport protocol header (UDP/TCP). The application specific metadata header includes information such as a final destination node, a configured number of hops, a current hop count. A security association associated with an intermediate node is randomly selected by a randomized traffic selector algorithm. The security association is randomly selected from the list of security associations. Upon receiving the packet at the intermediate node, a current hop count is incremented. It is determined that the current hop count is equal to the configured number of hops. The packet is sent to the destination node via the intermediate node based on the randomly selected security association.

14 Claims, 7 Drawing Sheets

RANDOMIZED TRAFFIC SELECTION FOR FLOW DECEPTION IN IPSEC AD-HOC AND CLOAKED NETWORKS

BACKGROUND

Internet protocol security (IPsec) is a secure network protocol suite that authenticates and encrypts packets of data sent over internet protocol (IP) networks. IPsec secures applications at the IP layer. Traffic analysis attacks aim at deriving information from the analysis of traffic transmitted over a network such as the IP network. These attacks operate irrespective of the deployed encryption means and allow the extraction from the statistical analysis of the packet sizes and of their inter-arrival times, application layer protocol, physical devices used, web page accessed, etc. Various techniques such as traffic flow confidentiality (TFC) mechanism is used to masquerade the traffic pattern to prevent statistical traffic analysis attacks. TFC mechanism may be integrated as a security protocol in the IPsec security architecture to prevent the statistical traffic analysis attacks. In TFC mechanism, the packet structures are modified to prevent the statistical traffic analysis attacks, whereas the packet flow between nodes or physical devices remain constant/static. It is challenging to prevent the statistical traffic analysis attacks when the path taken by the packets remain constant as in the TFC mechanism.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques of randomized traffic selection for flow deception in IPsec ad-hoc and cloaked network are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
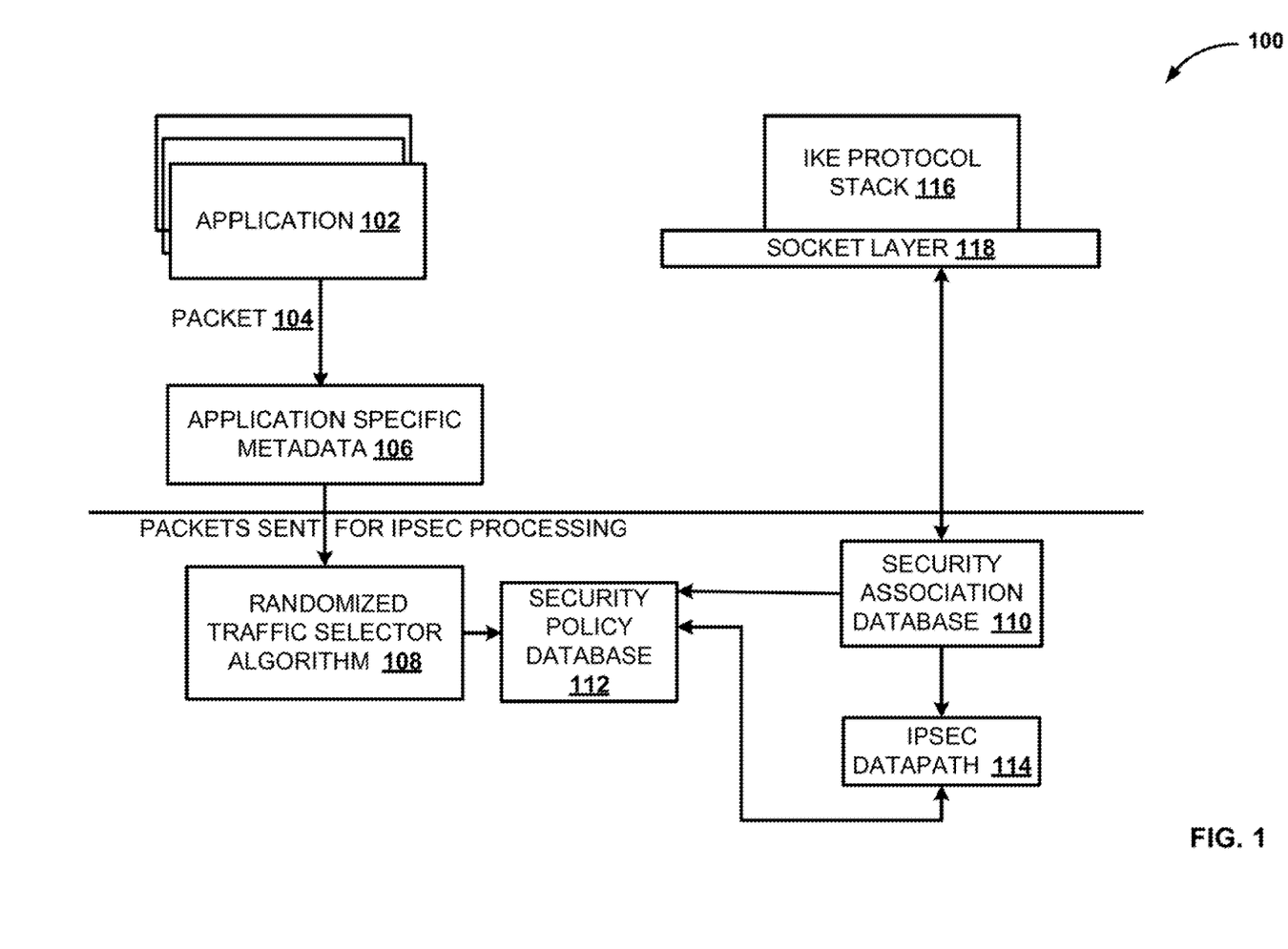
FIG. 1 is a block diagram illustrating high level architecture of a system for randomized traffic selection in IPsec networks, according to one embodiment.

FIG. 1 is a block diagram illustrating high level architecture of a system 100 for randomized traffic selection in IPsec networks, according to one embodiment. IPsec uses cryptographic security to protect communications over IP networks. IPsec supports network-level peer authentication, data-origin authentication, data integrity, encryption and replay protection. In IPsec, major protocols used to provide security are authentication header (AH) protocol, and a combined encryption/authentication protocol also referred to as an encapsulating security protocol (ESP) protocol. Application 102 executing in a node is responsible for establishing an ad-hoc or a cloaked network. In the case of the ad-hoc network, the application 102 supports packet forwarding to ensure that packet 104 reaches its destination node. The node may be a host, a physical device, a component, or the like. The application 102 may establish a mesh network with the other nodes in the ad-hoc network. In the mesh network, nodes such as bridges, switches, routers, and the like, connect directly, dynamically to each other and coordinate with one another to efficiently route data to and from the source node and to the destination node. The packet 104 from the source node reaches the destination node either directly or via intermediate nodes. The application 102 builds a connectivity graph of all the nodes also referred to as peers, and deduces a path from the source node to the destination node through intermediate nodes. The path from the source node to an intermediate node is referred to as a hop, and a count associated with the hop is referred to as a hop count.

The packet 104 forwarded from the source node is referred to as an outgoing packet, and the packet 104 received at the destination node is referred to as an incoming packet. For an outgoing packet from the source node, the outgoing packet is encapsulated in transport protocol header (UDP/TCP) along with application specific metadata header 106. The application specific metadata 106 header includes information such as a final destination node e.g. IP address of the destination node, a configured number of hops e.g. user defined/pre-configured number of hops, a current hop count e.g. at the source node the current hop count is '0' since this is the packet origination node. The outgoing packet along with the application specific metadata 106 header is sent for IPsec processing.

Randomized traffic selector algorithm 108 is implemented with a security association database (SAD) 110 which selects a security association to a node. The security association database is also referred to as an IPSec security association database. Security policy database (SPD) 112 contains a set of rules that determine whether the packet 104 is subject to IPsec processing and governs the processing details. Based on the rules in the SPD 112, the inbound or outbound packet is processed in one of the three ways such as discard the packet 104, perform IPsec processing or bypass IPsec processing of the packet 104. SAD 110 is a central repository containing all the security associations (SAs) for both the inbound and outbound packets. The SA defines a connection in one direction from one node/host to another node/host. The SA includes relevant attributes of the connection including the cyrptographic algorithm used, the IPsec mode used, encryption key and other parameters related to the transmission of data over the connection. The individual entry in the SAD defines the parameters for a specific SA, and the SA maintains information on a node to which this SA entry applies.

IPsec data path 114 performs the actual IPsec processing of the packet 104. Internet key exchange (IKE) protocol stack 116 is used to set up a SA in the IPsec protocol. IKE protocol is defined to allow nodes to specify the services to be incorporated in the packet 104, the cyrptographic algorithms to be used to provide those services and a mechanism for sharing the keys with those cryptographic algorithms. When the packet 104 is received from the source node executing application 102, the rules in the SPD 112 is looked up to determine whether the packet 104 is to be IPsec processed or not. Upon determining that the packet is to be IPsec processed, the randomized traffic selector algorithm 108 uses the information in the SPD 112 to determine the set of SA from the SAD 110 to process the packet 104. The randomized traffic selector algorithm 108 randomly selects an SA and forwards the packet 104 to a node associated with the randomly selected SA, and increments the current hop count. If the current hop count matches the configured number of hops, the packet is forwarded to the destination node based on a SA associated with the destination node. Forwarding the packets takes place in a secure socket layer 118 established between the nodes.

Figure 2:
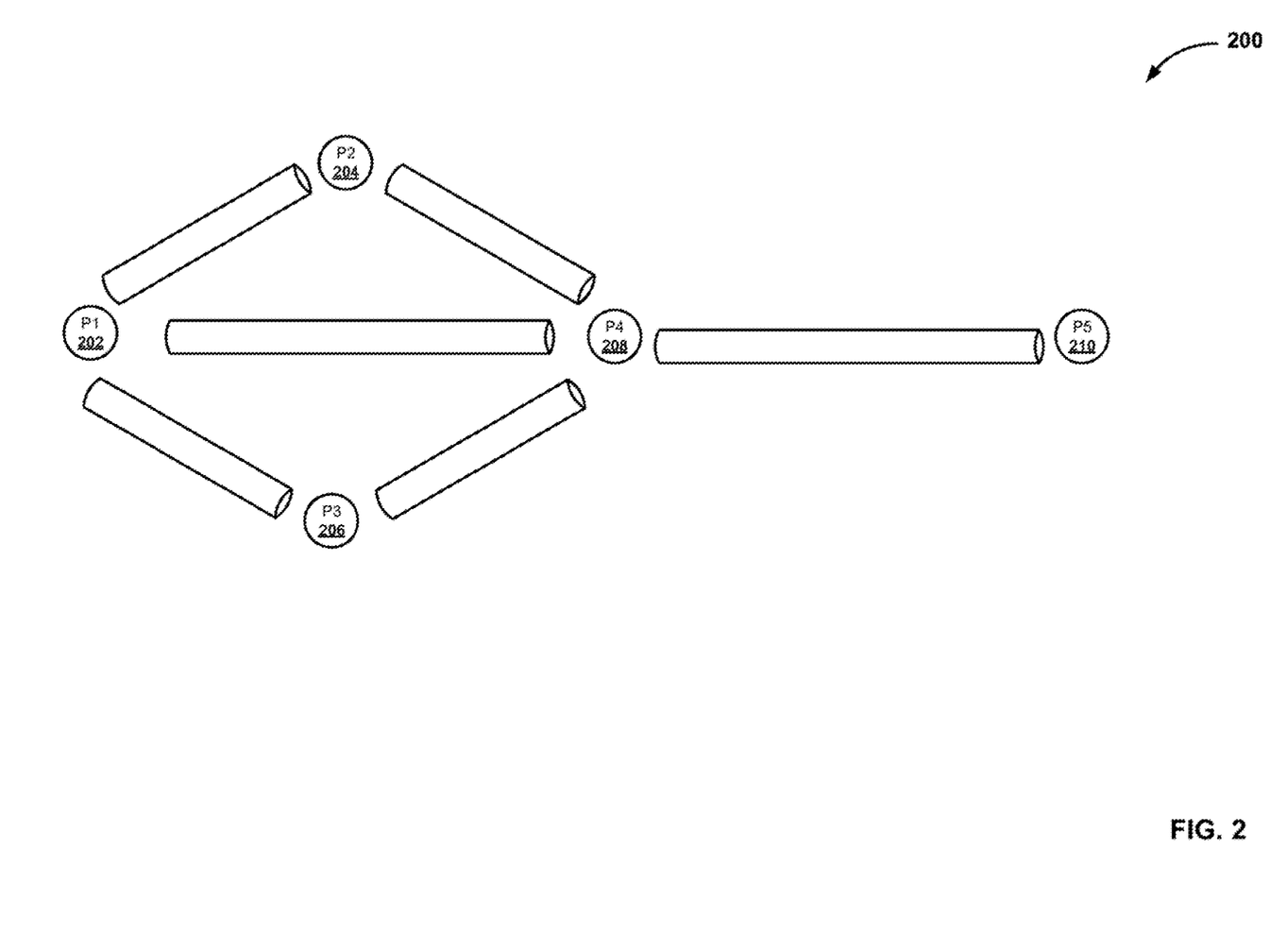
FIG. 2 is a flow diagram illustrating randomized traffic selection in IPsec networks, according to one embodiment.

FIG. 2 is flow diagram 200 illustrating randomized traffic selection in IPsec networks, according to one embodiment. Consider an ad-hoc network with individual nodes/hosts 'P1' 202, 'P2' 204, 'P3' 206, 'P4' 208 and 'P5' 210. Applications executing in the nodes 'P1' 202 to 'P5' 210 have established peer to peer IPsec secure channel among themselves. If packets 'PKT1' and 'PKT2' is to be sent from a source node 'P1' 202 to a destination node 'P5' 210, the packets may take one of the three possible paths such as (a) 'P1' 202->'P2' 204->'P4' 208->'P5' 210, (b) 'P1' 202->'P4' 208->'P5' 210 or (c) 'P1' 202->'P3' 206->'P4' 208->'P5' 210. The nodes are associated with SA for IPsec processing. For example, security association 'SAp2' is associated with the node 'P2' 204, 'SAp3' is associated with the node 'P3' 206, 'SAp4' is associated with the node 'P4' 208 and 'SAp5' is associated with the node 'P5' 210.

The source node 'P1' 202 encapsulates 'PKT1' in a transport protocol header (TCP/UDP) along with an application specific metadata header. The application specific metadata header includes information such as a final destination node e.g. IP address of the destination node 'P5' 210, a configured number of hops e.g. user defined/pre-configured number of hops as '2', a current hop count e.g. at the source node the current hop count is '0' since this is the packet origination node. The packet 'PKT1' reaches a data path. The rules in an SPD is looked for IPsec processing, and it is determined that the packet 'PKT1' is to be IPsec processed. The randomized traffic selector algorithm determines that the configured number of hops as '2' and the current hop count as '0'. The randomized traffic selector algorithm uses the information in the SPD to determine the set of SA from the SAD to process the packet. Here the set of SAs which can process the packet 'PKT1' are SAp2, SAp3 and SAp4. The randomized traffic selector algorithm randomly selects one of the security association for the packet 'PKT1'. Here, the security association SAp2 is randomly selected for the packet 'PKT1'.

The packet 'PKT1' is sent to node 'P2' 204 with SAp2 IPsec processing. The current hop count is incremented by '1'. It is determined whether the current hop count '1' is less than the configured number of hops '2'. Upon determining that the current hop count '1' is less than the configured number of hops '2', the randomized traffic selector algorithm randomly selects one of the security association SAp4, and the packet 'PKT1' is forwarded from the node 'P2' 204 to the node 'P4' 208 associated with SAp4 and the current hop count is incremented to '2'. It is determined whether the current hop count '2' is less than the configured number of hops '2'. Upon determining that the current hop count '2' is equal to the configured number of hops '2', the randomized traffic selector algorithm selects the security association SAp5 associated with the final destination node 'P5' 210.

The packet 'PKT1' is forwarded to the final destination node 'P5' 210. When the packet 'PKT1' is received at the destination node 'P5', the packet 'PKT1 is decrypted at the destination node 'P5'. Thus the packet 'PKT1' traverses through the mesh network achieving deceptive flow. It is referred to as deceptive flow between the source node and the destination node because a random deceiving path is taken by the packet between the source node and the destination node. Hence it is difficult to perform statistical analysis attack because the SAs are randomly selected in the ad-hoc network. The randomized traffic selector algorithm may randomly select the security association SAp3 for the packet 'PKT2' and send it to the node 'P3' 206 for IPsec processing and the current hop count is incremented to '2'. It is determined whether the current hop count '2' is less than the configured number of hops '2'. Upon determining that the current hop count '2' is equal to the configured number of hops '2', the randomized traffic selector algorithm selects the security association SAp5 associated with the final destination node 'P5' 210. The packet 'PKT1' is forwarded to the final destination node 'P5' 210.

Figure 3:
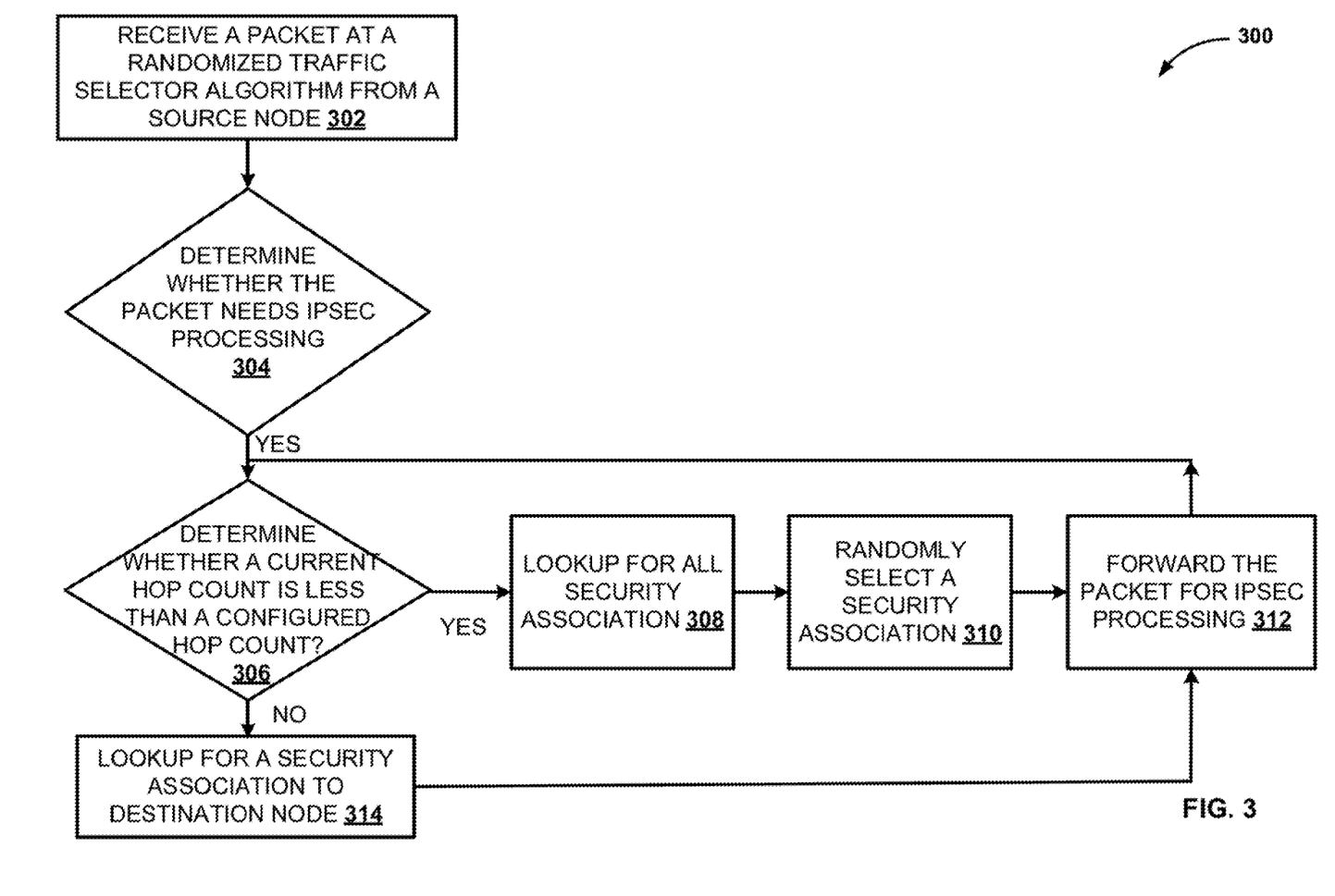
FIG. 3 is a flow diagram illustrating randomized traffic selection in a IPsec network, according to one embodiment.

FIG. 3 is flow diagram 300 illustrating randomized traffic selection in a IPsec network, according to one embodiment. At 302, a packet is received from a source node at a randomized traffic selector algorithm. The randomized traffic selector algorithm is implemented with a security association database (SAD) which selects a security association to a node. Security policy database (SPD) contains a set of rules that determine whether the packet is subject to IPsec processing. At 304, it is determined whether the packet needs IPsec processing. Upon determining that the packet needs IPsec processing, the packet is forwarded to IPsec data path to perform the actual IPsec processing of the packet.

At 306, it is determined whether a current hop count is less than a configured hop count. Upon determining that the current hop count is less than the configured hop count, at 308, the set of security associations (SAs) are looked up from the SAD. At 310, a security association is randomly selected, and the security association is associated with an intermediate node. At 312, the packet is forwarded to the intermediate node for IPsec processing. Upon determining that the current hop count is not less than the configured hop count, at 314, a security association associated with a destination node is selected. The packet is forwarded to the destination node based on a SA associated with the destination node.

Figure 4:
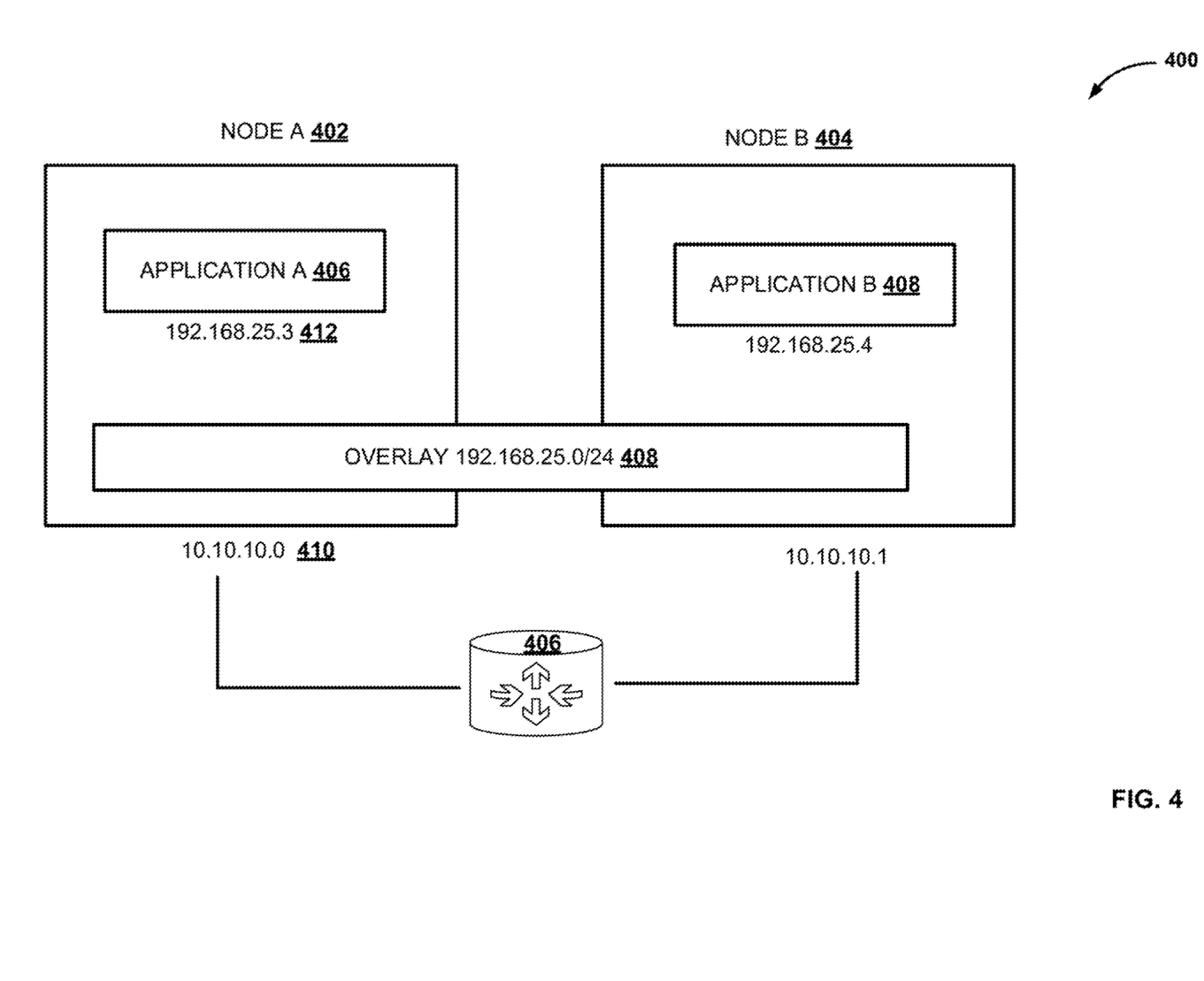
FIG. 4 is a block diagram illustrating an exemplary use case for randomized traffic selection in a cloaked network, according to one embodiment.

FIG. 4 is block diagram 400 illustrating an exemplary use case for randomized traffic selection in a cloaked network, according to one embodiment. An overlay is a virtual network that is built over an underlying network infrastructure (the underlay network). Consider network nodes such as node A 402 and node B 404 connected by router 406. The overlay network layer with IP address '192.168.25.0/24' 408 is created on top of the underlay IP network '10.10.10.0/24'. The nodes communicate using the overlay IP address, and the underlay IP address is hidden or cloaked. The applications executing in the nodes are aware of the overlay network. The packet with the overlay IP address '192.168.25.3' 412 is encapsulated and encrypted within an internet protocol (IP) packet with the underlay IP address '10.10.10.0' 410 of the node A 402 before forwarding the packet from the node A 402 to node B 404. The packet in the overlay network is subjected to processing as explained in FIG. 2. The packet is sent from the source node A to the destination node B 404 in a deceptive flow by randomly choosing SAs between the nodes.

Figure 5:
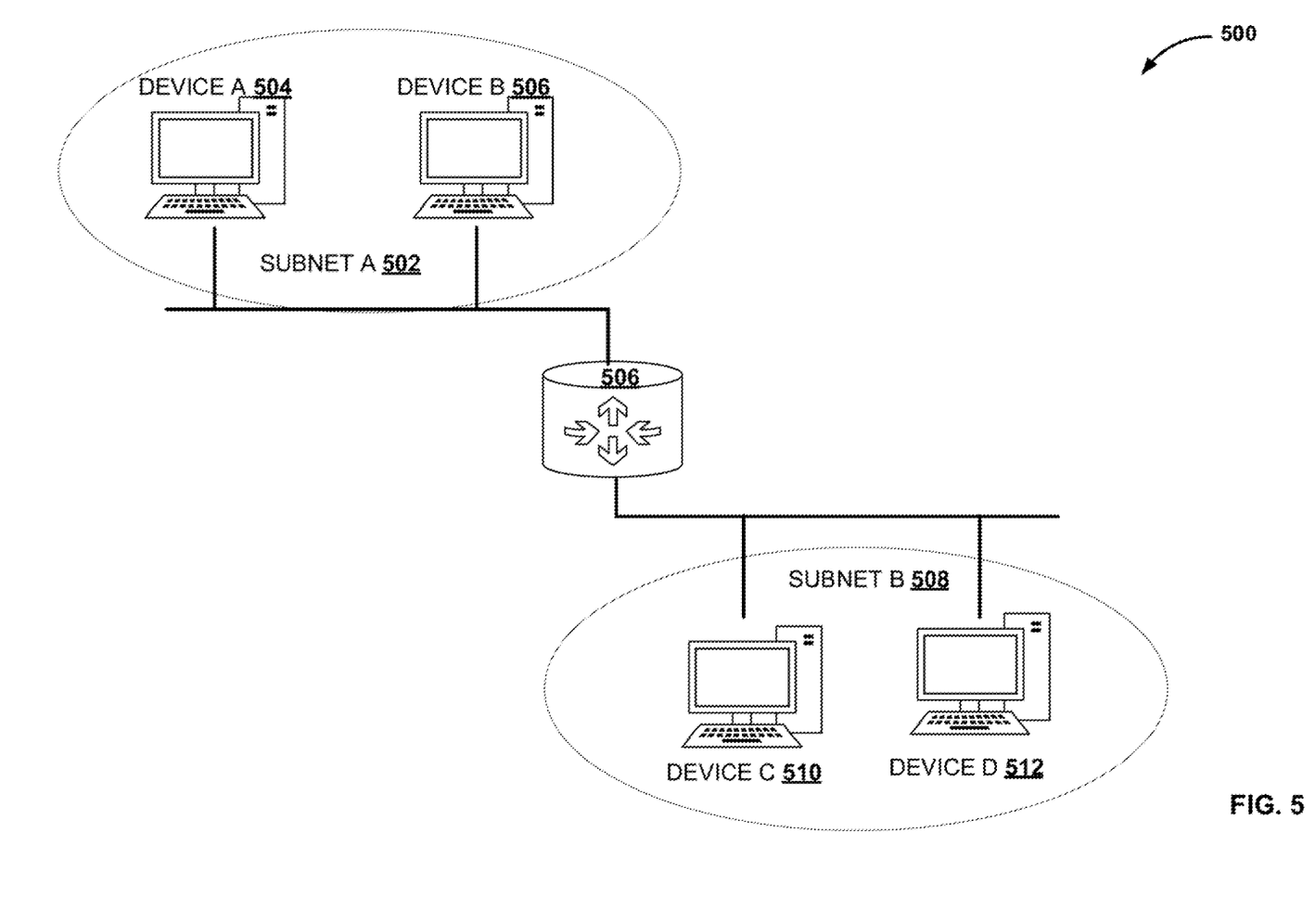
FIG. 5 is a block diagram illustrating exemplary use case for randomized traffic selection in a sub-net, according to one embodiment.

FIG. 5 is a block diagram illustrating exemplary use case for randomized traffic selection in a sub-net, according to one embodiment. Consider sub-net A or sub network A 502 that is a logical segmentation of a network address space, for example, sub-net A 502 may be an overlay sub-net. The sub-net A 502 has two devices such as device A 504 and device B 506 connected to it. Sub-net B 508 includes two devices such as device C 510 and device D 512, for example, sub-net B 508 may be an underlay sub-net. The sub-net A 502 and the sub-net B 504 communication through router 506. The device A 504 and the device B 506 in the sub-net A 502 execute application A. The device C 510 and the device D 512 in the sub-net B 508 execute application B. For an outgoing packet from the sub-net A 502, the outgoing packet is encapsulated in transport protocol header (UDP/TCP) along with application specific metadata header. The outgoing packet along with the application specific metadata header is sent for IPsec processing. Randomized traffic selector algorithm is implemented with a security association database (SAD) which selects a security association to a device. The randomized traffic selector algorithm is common for the application A and application B executing in various devices across varying sub-nets. Security policy database (SPD) contains a set of rules that determine whether the packet is subject to IPsec processing. IPsec datapath performs the actual IPsec processing. The randomized traffic selector algorithm randomly selects a SA and forwards the packet to a device associated with the randomly selected SA in the sub-net B 508. In one embodiment, the devices within a specific sub-net may execute different applications as well.

Figure 6:
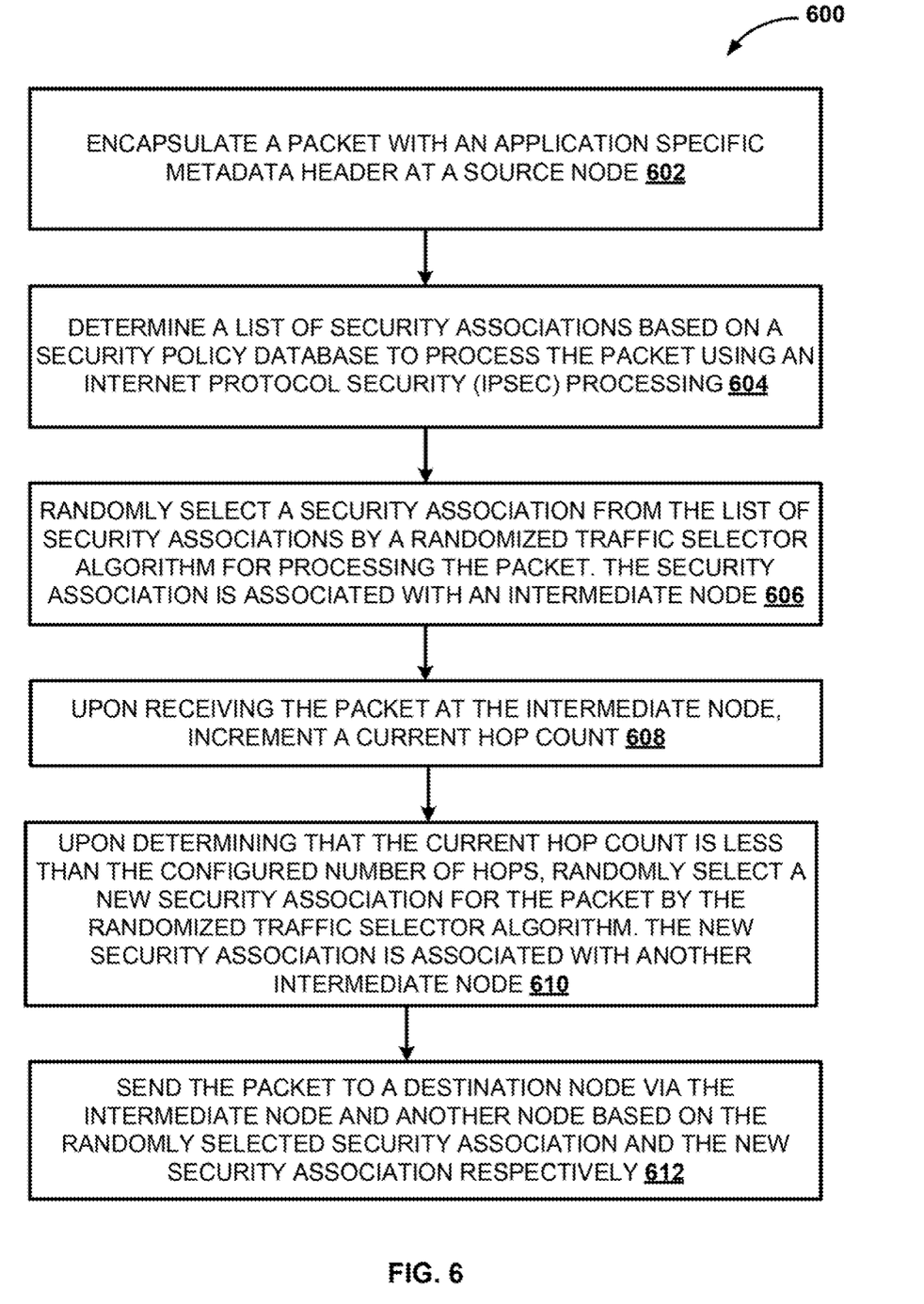
FIG. 6 is a flowchart illustrating method for randomized traffic selection in a IPsec network, according to one embodiment.

FIG. 6 is flowchart 600 illustrating method of randomized traffic selection in a IPsec network, according to one embodiment. A source node sends a packet to a destination node. At 602, the packet is encapsulated with an application specific metadata header and the source node encapsulates the packet in transport protocol header (UDP/TCP). The application specific metadata header includes information such as a final destination node, a configured number of hops, a current hop count. At 604, a list of security associations based on a security policy database is determined to process the packet using IPsec processing. At 606, a security association associated with an intermediate node is randomly selected by a randomized traffic selector algorithm. The security association is randomly selected from the list of security associations. At 608, upon receiving the packet at the intermediate node, a current hop count is incremented. At 610, upon determining that the current hop count is less than the configured number of hops, a new security association is randomly selected by the randomized traffic selector algorithm. The new security association is associated with another intermediate node and the new security association is randomly selected from the list of security associations. At 612, the packet is sent to the destination node via the intermediate node and another node based on the randomly selected security association and the new security association respectively.

The randomized traffic selector algorithm can be implemented with varied applications, varied networks and varied technology. The randomized traffic selector algorithm enables randomized selection of security associations associated with nodes/devices. Because of this randomized selection of security associations a deceptive flow or deceptive path is created between the source node and the destination node. The deceptive path prevents the statistical traffic analysis attacks when the path taken by the packets is not static. The randomized traffic selector algorithm may be implemented in ad-hoc network, cloaked network, sub-networks, etc.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
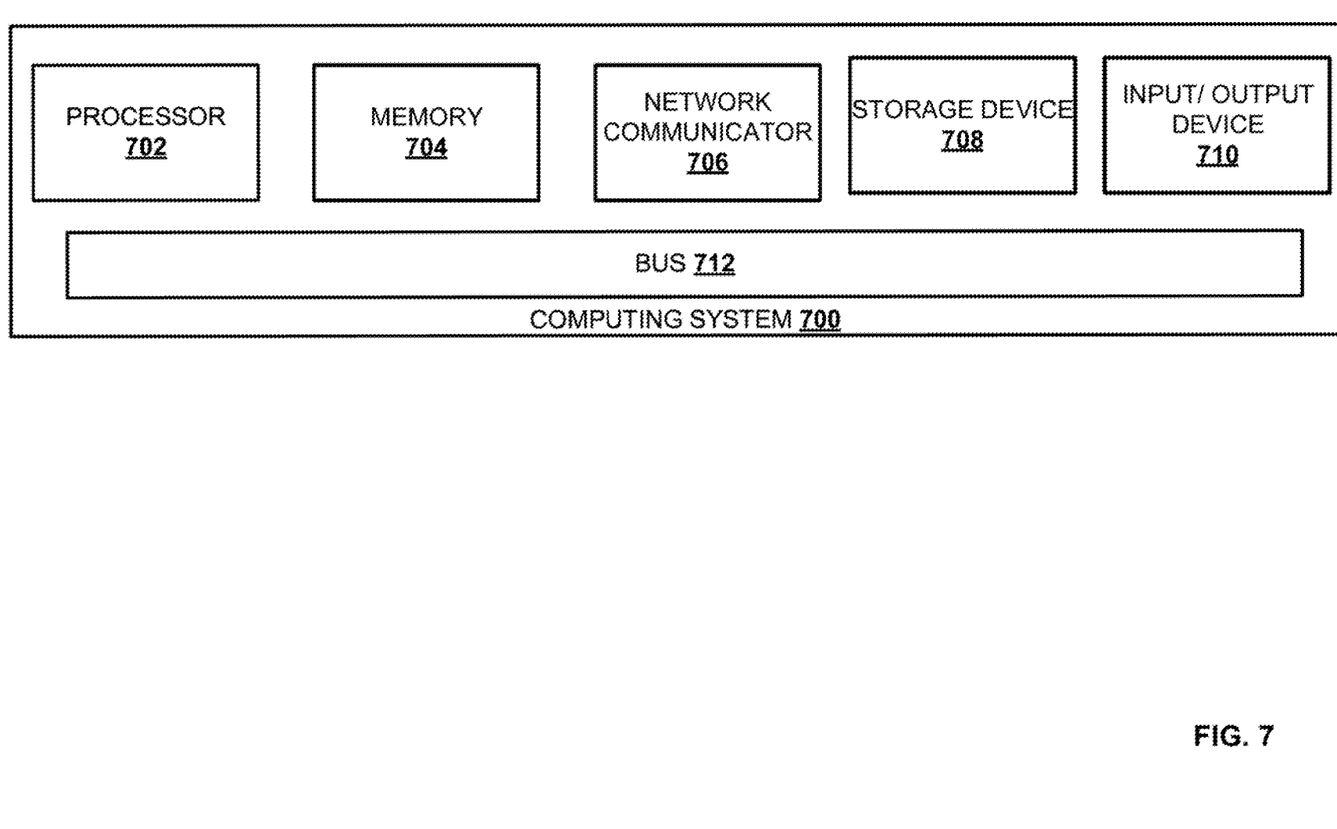
FIG. 7 is a block diagram of an exemplary computer system, according to one embodiment.

FIG. 7 is a block diagram illustrating a computing system 700 consistent with implementations of the current subject matter. As shown in FIG. 7, the computing system 700 can include a processor 702, a memory 704, network communicator 706, a storage device 708, and input/output devices 710. The processor 702, the memory 704, network communicator 706, the storage device 708, and the input/output device 710 can be interconnected via a system bus 712. The processor 702 is capable of processing instructions for execution within the computing system 700. Such executed instructions can implement one or more components of, for example, application A. In some example embodiments, the processor 702 can be a single-threaded processor. Alternately, the processor 702 can be a multi-threaded processor. The processor 702 is capable of processing instructions stored in the memory 704 and/or on the storage device 708 to display graphical information for a user interface provided via the input/output device 710.

The memory 704 is a computer readable medium such as volatile or non-volatile that stores information within the computing system 700. The memory 704 can store instructions and/or other data associated with the processes disclosed herein. The storage device 708 is capable of providing persistent storage for the computing system 700. The storage device 708 can be a hard disk device, an optical disk device, or a tape device, or other suitable persistent storage means. The input/output device 710 provides input/output operations for the computing system 700. In some example embodiments, the input/output device 710 includes a keyboard and/or pointing device. In various implementations, the input/output device 710 includes a display unit for displaying graphical user interfaces.

According to some example embodiments, the input/output device 710 can provide input/output operations for a network device. For example, the input/output device 710 can include Ethernet ports or other networking ports to communicate with one or more wired and/or wireless networks (e.g., a local area network (LAN), a wide area network (WAN), the Internet).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. Upon activation within the applications, the functionalities can be used to generate the user interface provided via the input/output device 710. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method for randomizing data traffic in an Internet Protocol Security (IPSec) protocol based ad-hoc network incorporating at least a source node, a destination node, and a plurality of intermediate nodes, said method comprising the following computer-implemented steps:

encapsulating, at said source node, a data packet with application-specific metadata header and a predetermined transport layer protocol header, and configuring said application-specific metadata header to describe at least a current hop count corresponding to said data packet and pre-configured number of allowable hops;

storing in a security policy database (SPD), a pre-defined set of rules applicable to each of said source node, said destination node, and said plurality of intermediary nodes respectively, and wherein said set of rules determine at least whether said data packet should be processed in line with IPSec protocol at each of said source node, said plurality of intermediary nodes, and said destination node;

in an event said set of rules incorporated within said security policy database enable said source node, said destination node, and at least some of said intermediary nodes to process said data packet in line with IPSec protocol:

generating security associations (SA) in line with said IPSec protocol and applying said security associations respectively to said source node, said destination node, and said at least some of said intermediary nodes configured in line with said IPSec protocol;

processing, at said source node, said data packet in line with said IPSec protocol, and randomly selecting a security association configured in line with said IPSec protocol;

determining, at said source node, said current hop count corresponding to said data packet, and transmitting said data packet from said source node to an intermediary node associated with randomly selected security association, only in an event said current hop count is determined to be less than said pre-configured number of allowable hops;

processing said data packet at said intermediary node, and determining, at said intermediary node, if said event current hop count corresponding to said data packet is less than said pre-configured number of allowable hops;

in an event said current hop count corresponding to said data packet is determined to be less than said pre-configured number of allowable hops, randomly selecting a second security association configured in line with said IPSec protocol, and transmitting said data packet from said intermediary node to a second intermediary node associated with said second security association;

in an event said current hop count corresponding to said data packet is determined to be equivalent to said pre-configured number of allowable hops, transmitting said data packet from said intermediary node to said destination node, in line with a third security association corresponding to said destination node; and achieving flow deception in transmission of said data packet from said source node to said destination node, by routing said data packet through randomly selected security associations and corresponding intermediary nodes.

2. The method as claimed in claim 1, wherein the step of generating security associations (SA) in line with said IPSec protocol, further includes the following steps:

storing said security associations in a centralized security association database (SAD);

storing in said security information database, information describing an association between each of said source node, said destination node, and said plurality of intermediary nodes, and each of said security associations respectively; and configuring each of said security associations to specify at least services to be incorporated into said data packet, cryptographic algorithms to be executed to enable said services, an IPSec mode to be used for processing said data packet, and a procedure for rendering cryptographic keys to said cryptographic algorithms.

3. The method as claimed in claim 1, wherein the step of configuring said application-specific metadata header, further includes the step of configuring said application-specific metadata header to specify an IP address of said destination node.

4. The method as claimed in claim 1, wherein the step of transmitting said data packet from said source node to an intermediary node associated with randomly selected security association, further includes the step of incrementing said current hop count by one, in response to transmission of said data packet from said source node to said intermediary node.

5. The method as claimed in claim 1, wherein the step of transmitting said data packet from said intermediary node to said second intermediary node associated with said second security association, includes the step of further incrementing said current hop count by one, in response to transmission of said data packet from said intermediary node to said second intermediary node.

6. The method as claimed in claim 1, wherein the method further includes the step of iteratively and randomly selecting any of said security associations configured in line with said IPSec protocol and iteratively transmitting said data packet from said source node to said intermediary nodes associated with randomly selected security associations, until said current hop count is determined, at any of said intermediary nodes, to be equivalent to said pre-configured number of allowable hops.

7. The method as claimed in claim 6, wherein the method further includes the step of transmitting said data packet from any of said intermediary nodes to said destination node, only in an event said current hop count is determined to be equivalent to said pre-configured number of allowable hops.

8. A computer-implemented system for randomizing data traffic in an Internet Protocol Security (IPSec) protocol based ad-hoc network incorporating at least a source node, a destination node, and a plurality of intermediate nodes, said system comprising:
   a processor;
   a memory module communicably coupled to said processor, said memory module storing computer program code, wherein said memory module and said computer program code stored therein are configured, with the processor, to:
      encapsulate, at said source node, a data packet with application-specific metadata header and a predetermined transport layer protocol header, and configure said application-specific metadata header to describe at least a current hop count corresponding to said data packet and pre-configured number of allowable hops;
      trigger a security policy database (SPD) to store a pre-defined set of rules applicable to each of said source node, said destination node, and said plurality of intermediary nodes respectively, and configured to determine at least whether said data packet should be processed in line with IPSec protocol at each of said source node, said plurality of intermediary nodes, and said destination node;
      in an event said set of rules incorporated within said security policy database enable said source node, said destination node, and at least some of said intermediary nodes to process said data packet in line with IPSec protocol:
         generate security associations (SA) in line with said IPSec protocol and apply said security associations respectively to said source node, said destination node, and said at least some of said intermediary nodes configured in line with said IPSec protocol;
         trigger said source node to process said data packet in line with said IPSec protocol and select in a random manner a security association configured in line with said IPSec protocol;
         trigger said source node to determine said current hop count corresponding to said data packet, and further trigger said source node to transmit said data packet to an intermediary node associated with randomly selected security association, only in an event said current hop count is determined to be less than said pre-configured number of allowable hops;
         trigger said intermediary node to process said data packet and determine if said event current hop count corresponding to said data packet is less than said pre-configured number of allowable hops;
         in an event said current hop count corresponding to said data packet is determined to be less than said pre-configured number of allowable hops, trigger said intermediary node to select in said random manner a second security association configured in line with said IPSec protocol, and trigger said intermediary node to transmit said data packet to a second intermediary node associated with said second security association; and
         in an event said current hop count corresponding to said data packet is determined to be equivalent to said pre-configured number of allowable hops, trigger said intermediary node to transmit said data packet to said destination node, in line with a third security association corresponding to said destination node; and
         achieve flow deception in transmission of said data packet from said source node to said destination node, by routing said data packet through randomly selected security associations and corresponding intermediary nodes.

9. The computer-implemented system as claimed in claim 8, wherein said processor is further configured to:
   trigger a centralized security association database (SAD) to store said security associations;
   configure said security association database to store information describing an association between each of said source node, said destination node, and said plurality of intermediary nodes, and each of said security associations respectively; and
   configure each of said security associations to specify at least services to be incorporated into said data packet, cryptographic algorithms to be executed to enable said services, an IPSec mode to be used for processing said data packet, and a procedure for rendering cryptographic keys to said cryptographic algorithms.

10. The computer-implemented system as claimed in claim 8, wherein said processor is further configured to:
   increment said current hop count corresponding to said data packet by one, in response to said data packet being transmitted from said source node to said intermediary node; and
   further increment said current hop count corresponding to said data packet by one, in response to said data packet being transmitted from said intermediary node to said second intermediary node.

11. The computer-implemented system as claimed in claim 8, wherein said processor is further configured to iteratively select in a random manner any of said security associations configured in line with said IPSec protocol, and iteratively transmit said data packet from said source node to said intermediary nodes associated with randomly selected security associations, until said current hop count is determined, at any of said intermediary nodes, to be equivalent to said pre-configured number of allowable hops.

12. The computer-implemented system as claimed in claim 11, wherein said processor is further configured to trigger transmission of said data packet from any of said intermediary nodes to said destination node, only in an event said current hop count is determined, at any of said intermediary nodes, to be equivalent to said pre-configured number of allowable hops.

13. A non-transitory computer-readable storage medium having computer-executable instructions stored thereon, said computer-executable instructions, when executed by a processor, cause said processor to:
   encapsulate, at a source node, a data packet with application-specific metadata header and a predetermined transport layer protocol header, and configure said application-specific metadata header to describe at least a current hop count corresponding to said data packet and pre-configured number of allowable hops;
   trigger a security policy database (SPD) to store a pre-defined set of rules applicable to each of said source node, a destination node, and a plurality of intermediary nodes respectively, and configured to determine at least whether said data packet should be processed in line with IPSec protocol at each of said source node, said plurality of intermediary nodes, and said destination node;

in an event said set of rules incorporated within said security policy database enable said source node, said destination node, and at least some of said intermediary nodes to process said data packet in line with IPSec protocol:
  generate security associations (SA) in line with said IPSec protocol and apply said security associations respectively to said source node, said destination node, and said at least some of said intermediary nodes configured in line with said IPSec protocol;
  trigger said source node to process said data packet in line with said IPSec protocol and select in a random manner a security association configured in line with said IPSec protocol;
  trigger said source node to determine said current hop count corresponding to said data packet, and further trigger said source node to transmit said data packet to an intermediary node associated with randomly selected security association, only in an event said current hop count is determined to be less than said pre-configured number of allowable hops;
  trigger said intermediary node to process said data packet and determine if said event current hop count corresponding to said data packet is less than said pre-configured number of allowable hops;
  in an event said current hop count corresponding to said data packet is determined to be less than said pre-configured number of allowable hops, trigger said intermediary node to select in said random manner a second security association configured in line with said IPSec protocol, and trigger said intermediary node to transmit said data packet to a second intermediary node associated with said second security association;
  in an event said current hop count corresponding to said data packet is determined to be equivalent to said pre-configured number of allowable hops, trigger said intermediary node to transmit said data packet to said destination node, in line with a third security association corresponding to said destination node; and
achieve flow deception in transmission of said data packet from said source node to said destination node, by routing said data packet through randomly selected security associations and corresponding intermediary nodes.

14. The computer-executable instructions as claimed in claim 13, wherein said computer-executable instructions, when executed by said processor, further cause said processor to:
  trigger a centralized security association database (SAD) to store said security associations;
  configure said security association database to store information describing an association between each of said source node, said destination node, and said plurality of intermediary nodes, and each of said security associations respectively;
  configure each of said security associations to specify at least services to be incorporated into said data packet, cryptographic algorithms to be executed to enable said services, an IPSec mode to be used for processing said data packet, and a procedure for rendering cryptographic keys to said cryptographic algorithms;
  increment said current hop count corresponding to said data packet by one, in response to said data packet being transmitted from said source node to said intermediary node;
  further increment said current hop count corresponding to said data packet by one, in response to said data packet being transmitted from said intermediary node to said second intermediary node;
  iteratively select in a random manner any of said security associations configured in line with said IPSec protocol and iteratively transmit said data packet from said source node to said intermediary nodes associated with randomly selected security associations, until said current hop count is determined, at any of said intermediary nodes, to be equivalent to said pre-configured number of allowable hops; and
  trigger transmission of said data packet from any of said intermediary nodes to said destination node, only in an event said current hop count is determined, at any of said intermediary nodes, to be equivalent to said pre-configured number of allowable hops.

* * * * *